(12) United States Patent
Gorman et al.

(10) Patent No.: US 8,542,495 B1
(45) Date of Patent: Sep. 24, 2013

(54) SECURITY ENCLOSURE FOR TABLET DISPLAY DEVICES

(75) Inventors: Daniel Gorman, Roswell, NM (US); Kemper Barkhurst, Albuquerque, NM (US)

(73) Assignee: NClosures, Inc., Traverse City, MI (US)

(*) Notice: Subject to any disclaimer, the term of this patent is extended or adjusted under 35 U.S.C. 154(b) by 244 days.

(21) Appl. No.: 13/212,770

(22) Filed: Aug. 18, 2011

(51) Int. Cl.
*H05K 5/00* (2006.01)
*G06F 1/16* (2006.01)

(52) U.S. Cl.
USPC .... 361/752; 361/730; 361/679.3; 361/679.02

(58) Field of Classification Search
USPC .................. 361/752, 679.01, 730, 796, 800,
361/807, 809, 810, 679.56, 679.3, 679.02,
361/679.55, 737; 312/223.1, 223.2; 248/278.1;
379/426, 433.11, 455; 455/575.1, 575.8;
190/100; 206/305, 320
See application file for complete search history.

(56) References Cited

U.S. PATENT DOCUMENTS

| | | |
|---|---|---|
| D279,185 S | 6/1985 | Felix et al. |
| D466,356 S | 12/2002 | Marsilio |
| D516,553 S | 3/2006 | Richardson et al. |
| D538,801 S | 3/2007 | Taylor |
| D574,819 S | 8/2008 | Andre et al. |
| D597,089 S | 7/2009 | Khan et al. |
| D606,591 S | 12/2009 | Pearson |
| D615,077 S | 5/2010 | Richardson et al. |
| D615,536 S | 5/2010 | Richardson et al. |
| D623,640 S | 9/2010 | Freeman |
| D626,540 S | 11/2010 | Brown et al. |
| D634,741 S | 3/2011 | Richardson et al. |
| D641,558 S | 7/2011 | Jedrey |
| D644,635 S | 9/2011 | Richardson et al. |
| D651,213 S | 12/2011 | Magness et al. |
| D652,825 S | 1/2012 | Bau |
| D653,202 S | 1/2012 | Hasbrook et al. |
| D654,490 S | 2/2012 | Weller et al. |
| 8,132,670 B1 | 3/2012 | Chen |
| 8,139,357 B2 | 3/2012 | Trang |
| D663,294 S | 7/2012 | Buxton |
| D663,295 S | 7/2012 | Fahrendorff et al. |
| D664,528 S | 7/2012 | Chen et al. |
| D676,448 S | 2/2013 | Gorman et al. |
| 2001/0009500 A1 | 7/2001 | Selker |
| 2009/0009945 A1* | 1/2009 | Johnson et al. ............... 361/681 |
| 2009/0179132 A1 | 7/2009 | Qin et al. |

(Continued)

OTHER PUBLICATIONS

Business Listings Australia, iPad Kiosk Stands, http://businesslistingsaustralia.com.au/ipad-kiosk-..., Jun. 27, 2011, 2pp, Business Listings Australia, AU/U.S.

(Continued)

*Primary Examiner* — Hoa C Nguyen
*Assistant Examiner* — Ahmad D Barnes
(74) *Attorney, Agent, or Firm* — Traverse Legal, PLC

(57) ABSTRACT

A security enclosure for touchscreen-type electronic media display tablets such as the Apple® Ipad® tablet. The enclosure has a rear panel that can be mounted to a display or work surface, and a front panel that can be assembled to rotate open and closed on the rear panel with a novel panel-connecting structure that requires no tools or fasteners and that is tamper-resistant. The panel-connecting structure includes a U-shaped channel with radiused connecting tabs bent from an inside edge of the front panel, and a vertical wall with radiused tab-receiving slots bent from a mating interior edge of the rear panel.

7 Claims, 10 Drawing Sheets

(56) References Cited

U.S. PATENT DOCUMENTS

| | | | |
|---|---|---|---|
| 2009/0186264 | A1 | 7/2009 | Huang |
| 2009/0286417 | A1* | 11/2009 | Taguchi et al. ............ 439/331 |
| 2012/0061542 | A1 | 3/2012 | Bostater |

OTHER PUBLICATIONS

Lab Shield, A secure kiosk for your iPad, http://web.archive.org/web/20100719010924/http://labshield.com/, Jul. 19, 2010,1 page, LabShield.com, U.S.

Bill, iPad Kiosks, www.padgadget.com/2010/07/15/ipad-kiosks/, Jul. 15, 2010, 10pp, PadGadget.com, U.S.

Mobile Muse, iPad Pedestal Stands for Sale, www.mobilemuse.com.au/2011/08/ipad-pedestal-stands-for sale/,Aug. 7, 2011, 9pp, MobileMuse.com, AU/U.S.

PR Log, iPad-Kiosks Products—iPad Enclosure and Kiosk Mounts . . . , www.prlog.org/11000105-ipad-kiosks-products- . . . , Oct. 14, 2010, 2pp, PrLog.com, U.S.

Hipstomp, iPads make kiosks so easy, it's practically cheating, www.core77.com/blog/object_culture/ipads_make_. . . , Jul. 15, 2010, 3pp, Core77.com, U.S.

Maura, Seattle Seahawks use iPad Kiosks to Register 20,000 Fans for Open Practices, www.ipadforums.net/apple-ipad-news/9363-seattle- . . . , Aug. 29, 2010, 3pp, iPadForums.net,U.S.

Charlie, Tablet offered as Marketing Device, www.mixingdigital.co.uk/category/uncategorized/, Aug. 16, 2011, 2pp, Mixing Digital.co.uk, UK/U.S.

Scott Beale, Wooden iPad Kiosk for Square at Sightglass, http://laughingsquid.com/wooden-ipad-kiosk- . . . , Apr. 21, 2010, 8pp, LaughingSquid.com, U.S.

Advertising Lab, iPadKiosks, http://adverlab.blogspot.com/2010/07/ipad-kiosks.html,Jul. 15, 2010, 5pp, Advertising Lab, U.S.

Ipad News Tracker, Beyond Kiosks.com Reveals iPad Kiosks, www.ipadnewstracker.com/2010/07/beyondkiosks-com- . . . , Jul. 12, 2010, 4pp, iPad News Tracker, U.S.

Bimmer File, BMW NA Launches iPad Kiosk for Autoshows, www.bimmerfile.com/2010/11/06/bmw-na- . . . , Nov. 6, 2010, 7pp, Bimmer File, U.S.

Geeks Gab, Consider an iPad Kiosk as a Marketing Tool, www.geeksgab.com/consider-an-ipad- . . . , Jul. 25, 2011, 2pp, Geeks Gab, U.S.

Adrian J. Cotterill, iPad Kiosks, www.dailydooh.com/archives/50560 . . . , Jul. 11, 2011, 7pp, Daily Dooh, U.S.

RJ Cool, iBracket—Turn your iPad into iKiosk, www.itgrunts.com/2010/04/26/ibracket-turn- . . . , Apr. 26, 2010, 5pp, iT.Grunts, U.S.

Ian Wong, Industrial Design in Victoria Australia, www.ianwongresearch.blogspot.com/2011/08/launchpad-demo- . . . , Aug. 14, 2011, 8pp, Ian Wong, U.S.

Ipad Enclosures, iPadEnclosures—Secure.Simple., www.web-archive.org/web/20101112012631/http://www.ipadenclosures . . . Nov. 12, 2010, 2pp, Wayback Machine (iPad Enclosures), U.S.

Evo Exhibits, iPad Kiosk for Trade Shows, http://blog.evoexhibits.com/?p=3368 . . . , Jul. 21, 2011, 1page, Evo Exhibits, U.S.

Ipad Kiosk, The Official Patent Pending ipad kiosk with swiper, www.ipadkiosk.com/, 2009-2011(per copyright notice), 4 pp, iPadKiosk, U.S.

* cited by examiner

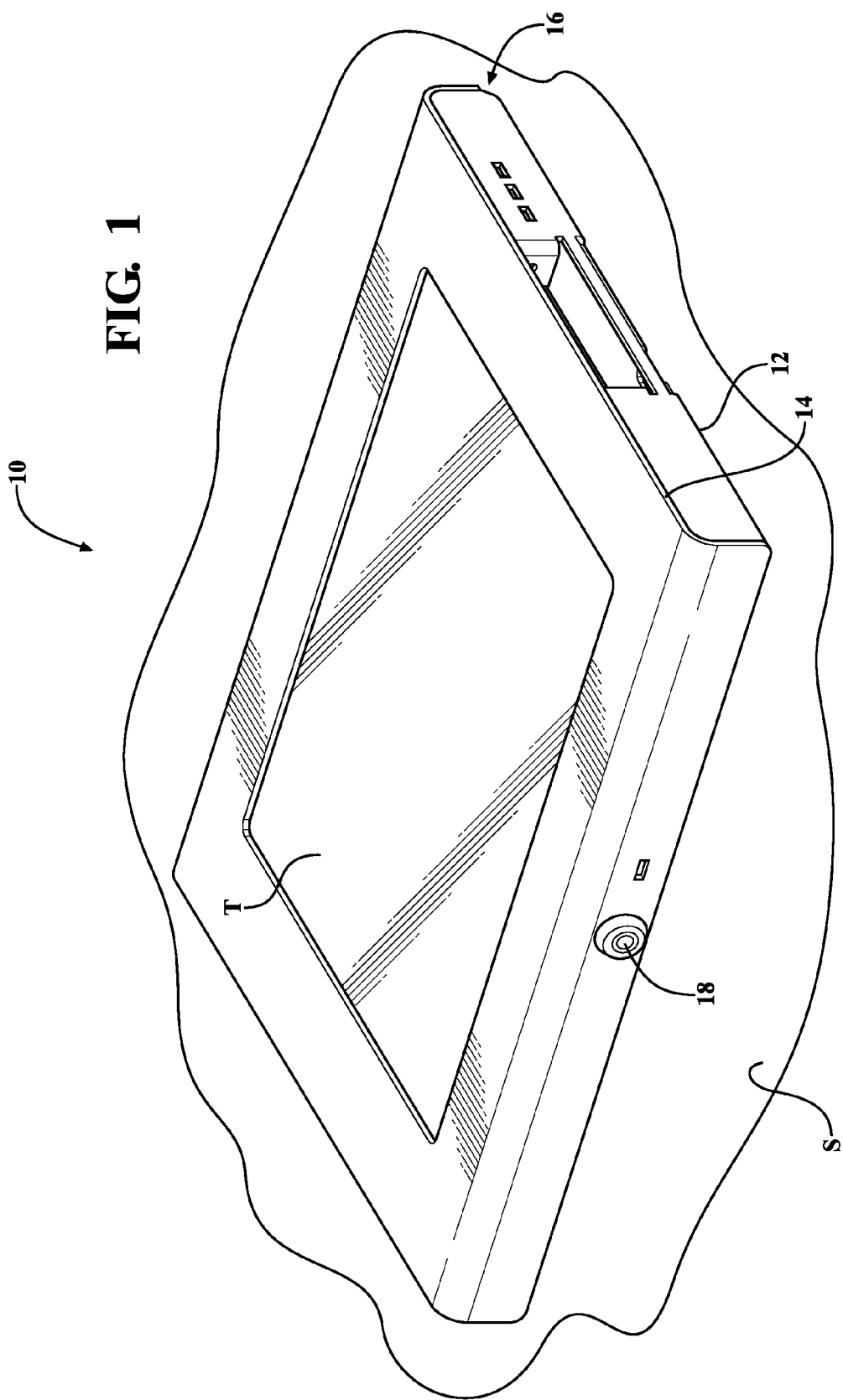

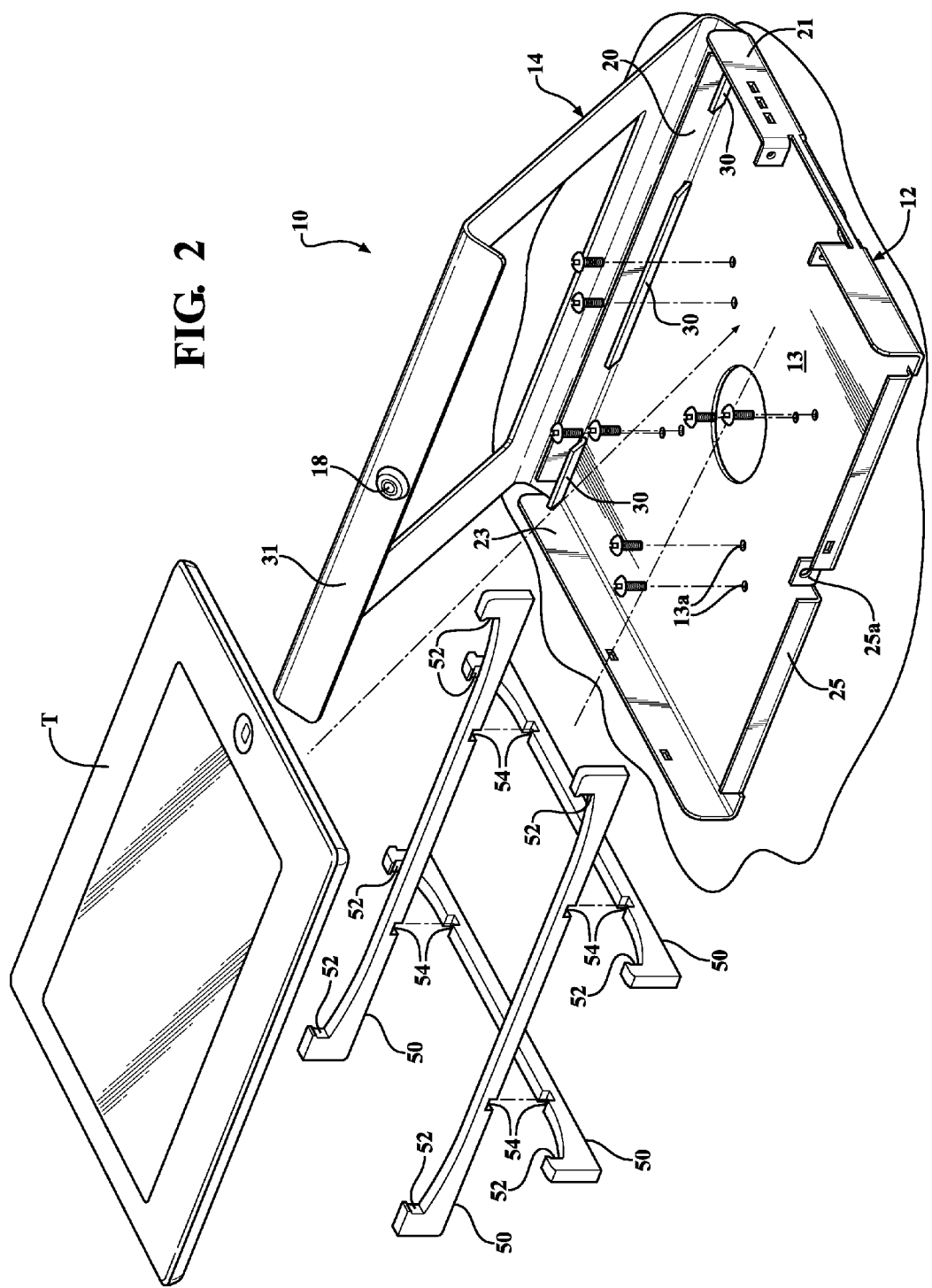

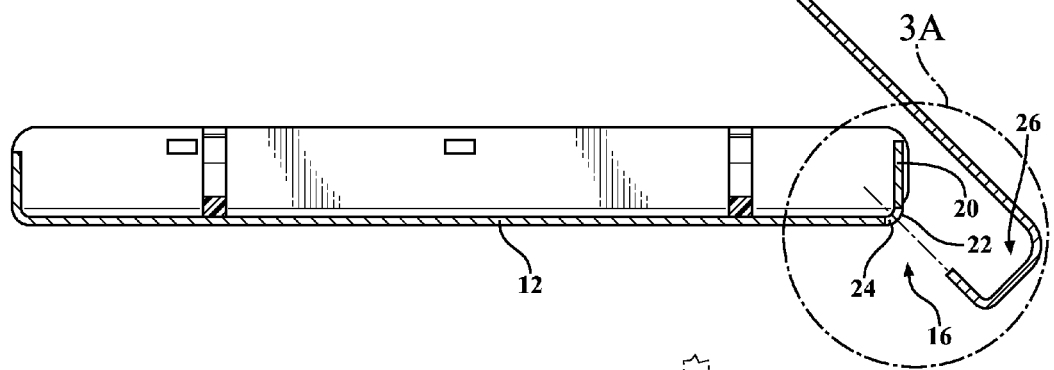
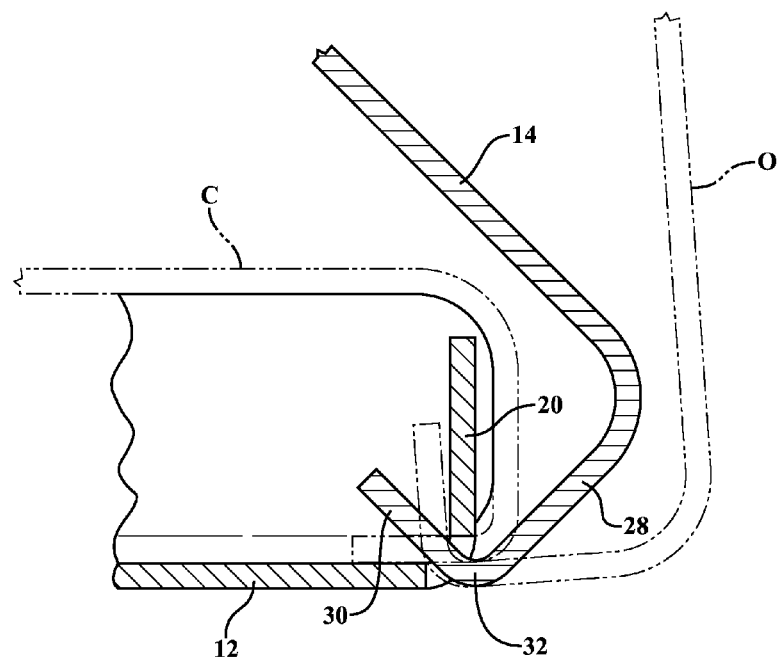

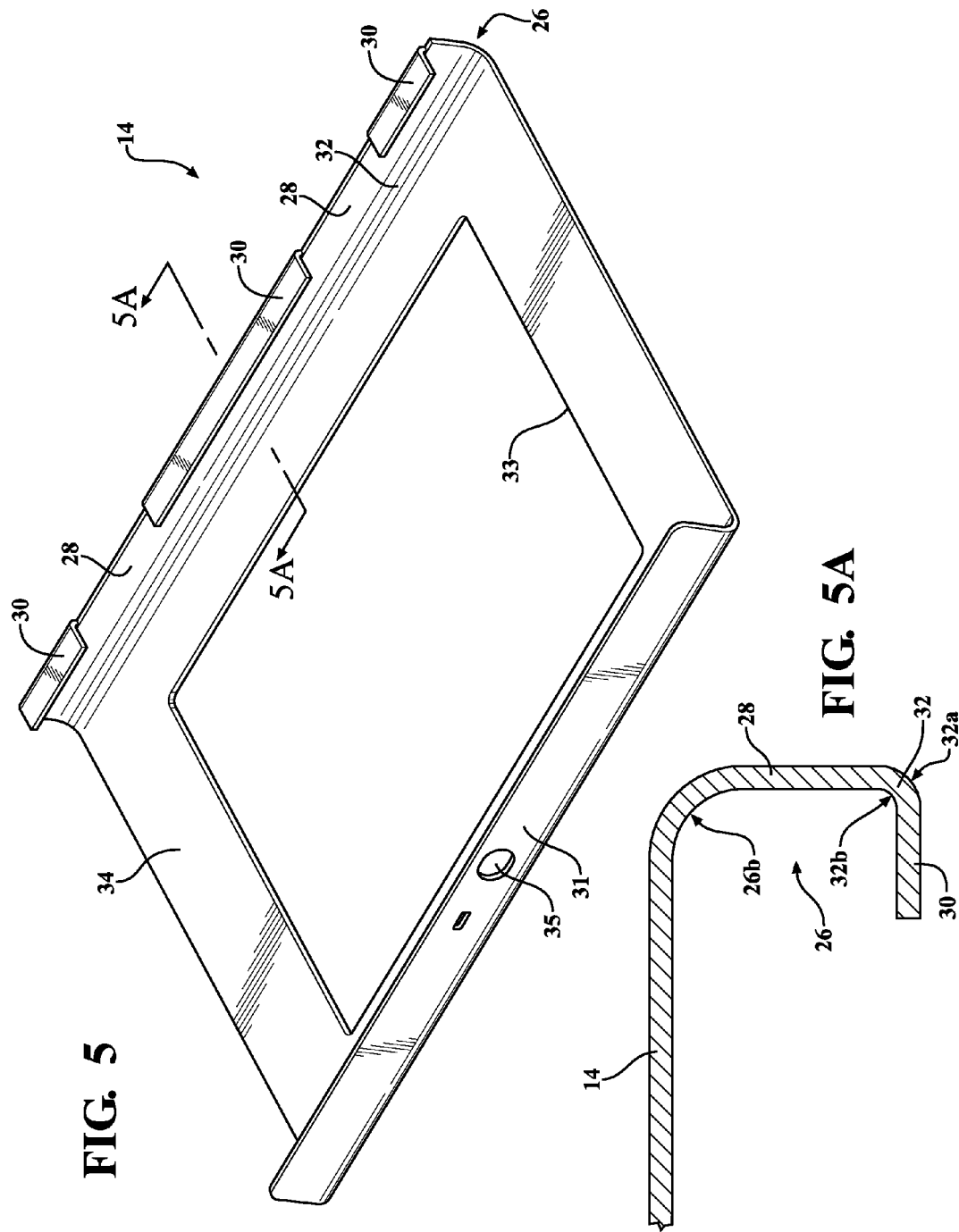

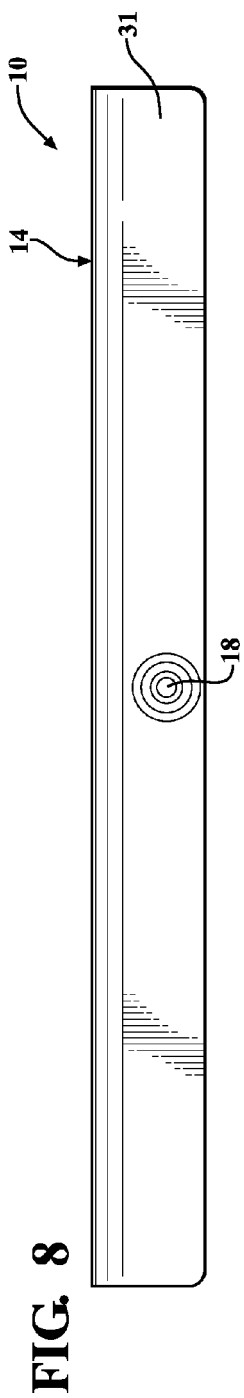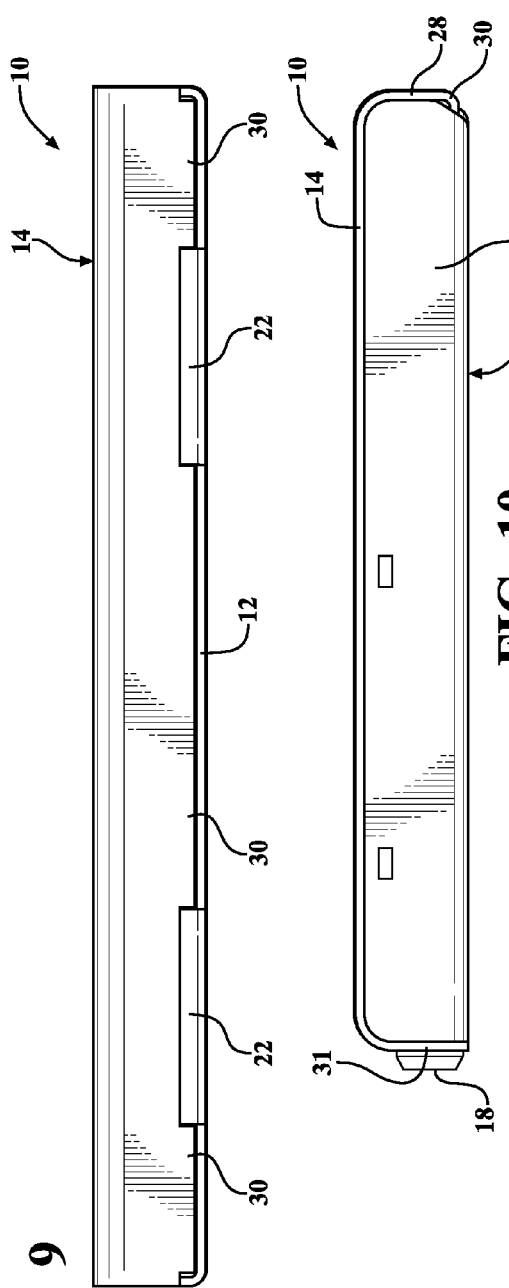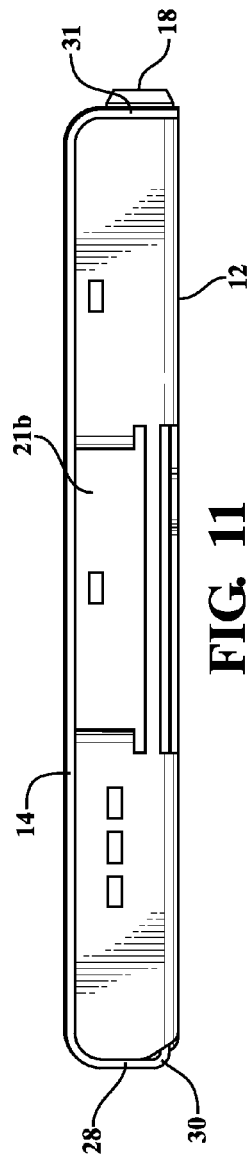

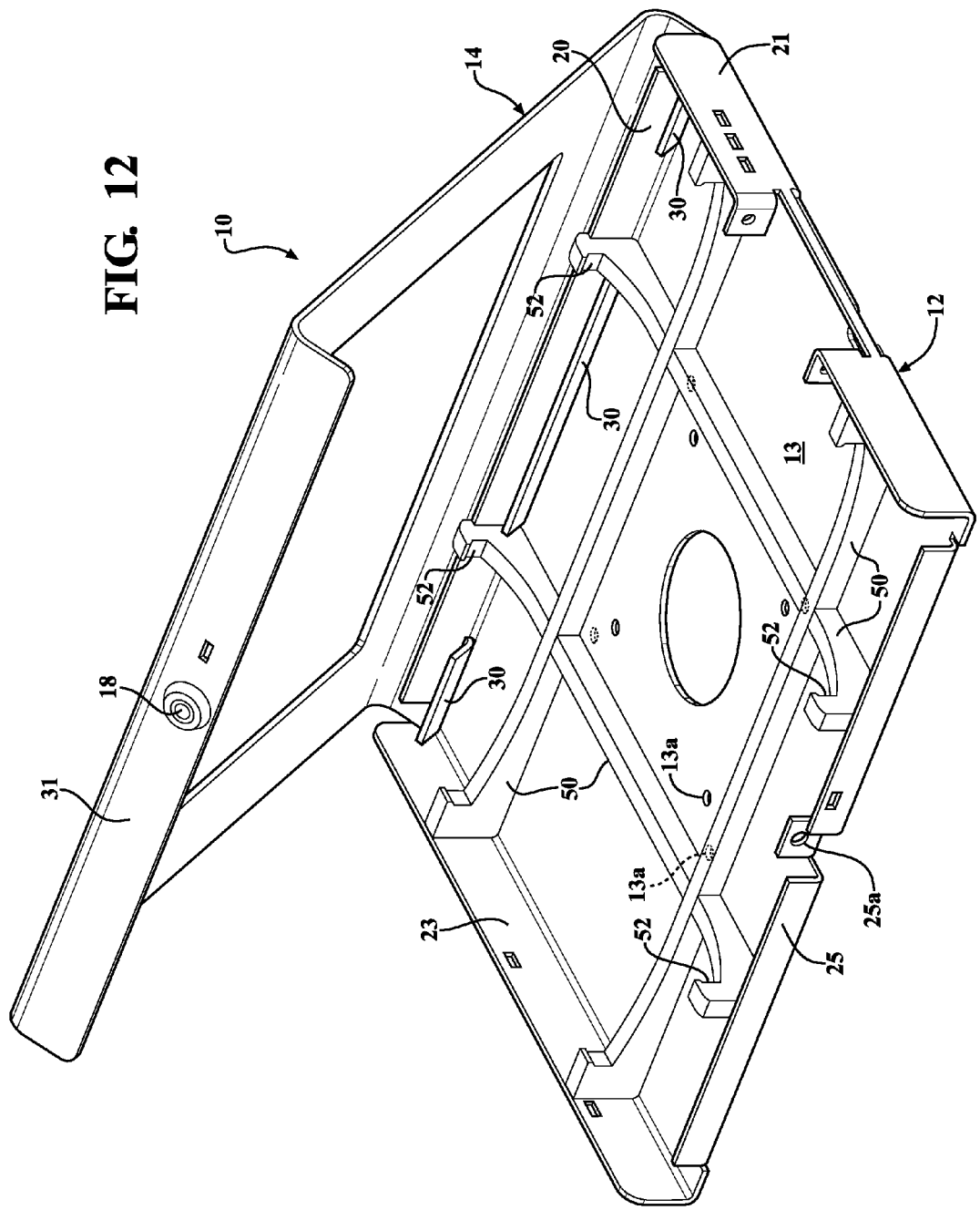

SECURITY ENCLOSURE FOR TABLET DISPLAY DEVICES

RELATED APPLICATIONS

Please see related U.S. patent application Ser. No. 29/399,786, now issued as U.S. Pat. No. D676,448, entitled DISPLAY TABLET ENCLOSURE, filed the same day by the same inventors.

FIELD

The subject matter of the present application is in the field of enclosures for portable electronic display devices, and more particularly security enclosures for portable "tablet" type display and/or computing devices such as the Apple® iPad® device and other media tablets.

BACKGROUND

Tablet type media devices that display information and graphics and that receive information and commands via an electronic touchscreen are increasingly popular. The Apple® iPad® device is a current and well-known example. Tablet display devices may be structured or programmed to function, by way of example and without limitation, as personal computers, passive and interactive media displays, book readers, point-of-sale advertising displays, interactive learning devices, electronic signs, entertainment devices for playing games and watching movies, Internet access points, and communications devices. The term "display tablet" will be used as shorthand for such devices.

One of the great advantages of display tablets is their lightweight, compact portability. This portability can make display tablets attractive to thieves, however, and using the tablets at information stands, kiosks, checkout lanes, museum displays, trade show booths, restaurant windows, and other places with high visitor traffic puts them at risk of being stolen or vandalized.

Display tablets must be secured in such public locations, yet the public must be able to view and access the tablets. Display tablets may also require frequent non-public access (by authorized persons) for recharging, card-reading, connecting accessory devices, operating various command buttons on the touchscreen reserved for non-public use, and downloading/uploading information and software. Also, display tablets may need to be removed from their enclosures on a periodic basis for security or maintenance or travel.

Security enclosures have been developed that allow display tablets to be secured in public locations with their touchscreens accessible for viewing or data entry. However, prior enclosures have often been complex to manufacture, relatively unattractive, and difficult to open and close for authorized access to the display tablet. For example, enclosures are known that use a dozen or more screws to hold the enclosure panels together around the enclosed display tablet.

BRIEF SUMMARY

We have invented a security enclosure for display tablets with touchscreens. The enclosure is a relatively flat enclosure with a two-piece body comprising a rear panel adapted to be mounted to a work or display surface, and a front panel adapted to be fitted over and secured to the rear panel. The front panel includes a front face with a screen opening corresponding to the display tablet's touchscreen, and with a border covering non-public controls or ports.

The enclosure has an internal panel-connecting structure along one edge that detachably secures the front panel to the rear panel without tools or fasteners or welds, and that allows the front panel to pivot between open and closed positions on the rear panel without hinges or other pivoting structure. The panel-connecting structure comprises an inwardly-facing, generally U-shaped channel formed along an interior edge of the front panel, the U-shaped channel comprising a substantially vertical flange extending downwardly from the inside surface of the front panel, and at least one substantially horizontal tab extending inwardly from a distal end of the vertical flange on a radiused joint. The panel-connecting structure further comprises a substantially vertical wall extending upwardly from a mating edge of the rear panel on a radiused bend, the wall interrupted by a radiused tab-receiving slot through the radiused bend. In the preferred form, the panels are made from metal and the mating panel-connecting structures (the U-shaped channel and the vertical wall) are formed as integral bend portions of the front and rear panels with radiused junctions.

In a further aspect, the enclosure includes interior locating means for properly positioning a display tablet in the enclosure. In a first form, the interior locating means is a plurality of raised locating tabs bent upwardly from the face of the rear panel into the interior volume of the enclosure, the tabs positioned to locate a display tablet so that its touch-screen is aligned with the opening in the front panel. In a second form, the interior locating means is a set of pre-cut resilient spacers provided with the enclosure, the spacers adapted to be interlocked on the rear panel in a grid pattern to position or locate a display tablet within the enclosure.

In a further aspect, the face of the rear panel is formed with a generally T-shaped cutout to receive a horizontal plug and its cord without regard to the angle at which the enclosure is mounted.

Possible display and work surfaces where the enclosure can be mounted include table-tops, kiosks, walls, swing arms, pedestals, dashboards, and others, without limitation.

These and other features and advantages of the invention will become apparent from the detailed description below, in light of the accompanying drawings.

BRIEF DESCRIPTION OF THE DRAWINGS

FIG. 1 is a front perspective view of an example enclosure according to the invention.

FIG. 2 is an exploded assembly view of the enclosure of FIG. 1 with a set of resilient spacers and a display tablet.

FIG. 3 is a side sectional view of the front and rear panels of the enclosure of FIG. 1, separated at an assembly angle.

FIG. 3A is a detail of the connection of the front and rear panels assembled as in FIG. 3, and with the front panel shown in different positions in broken lines.

FIG. 5 is a perspective view of the interior of the front panel.

FIG. 5A is a detail side view of the panel-connecting structure on the front panel, sectioned along the line shown in FIG. 5.

FIG. 8 is a front (lock) side elevation view of the enclosure of FIG. 1.

FIG. 9 is a rear (panel-connecting) side elevation view of the enclosure of FIG. 1.

FIG. 10 is a top side elevation view of the enclosure of FIG. 1.

FIG. 11 is a bottom side elevation view of the enclosure of FIG. 1.

FIG. 12 is a front perspective view of the enclosure of FIG. 1, with the front panel open.

DETAILED DESCRIPTION

Figures 4, 4A:
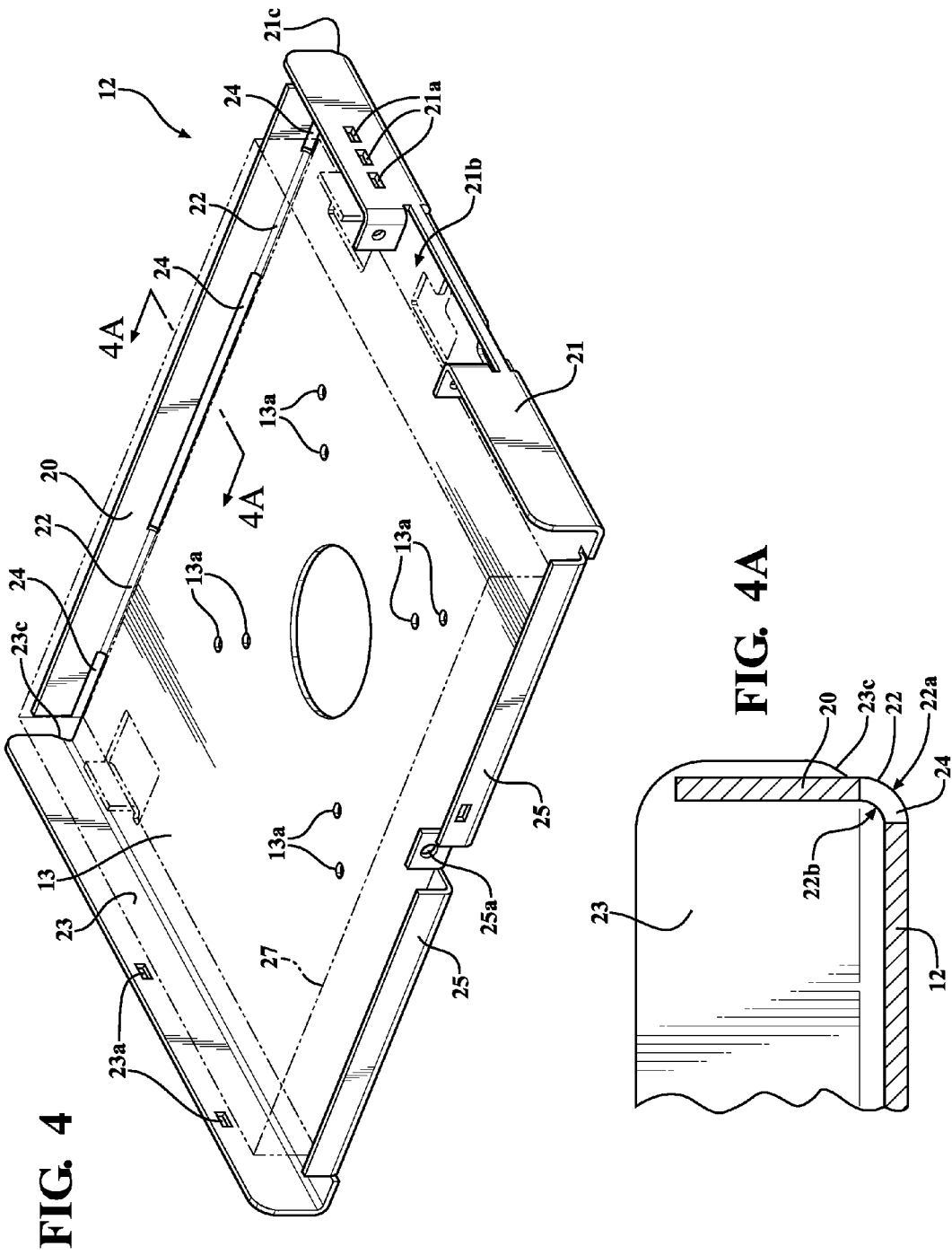
FIG. 4 is a perspective view of the interior of the rear panel.
FIG. 4A is a detail side view of the panel-connecting structure on the rear panel, sectioned along the line shown in FIG. 4.

Referring first to FIGS. 1 and 2, an enclosure 10 according to the invention is shown in exemplary form in order to teach how to make and use the claimed invention. Enclosure 10 includes a rear panel 12 that can be secured to a work surface S, and a front panel 14 that is detachably secured to rear panel 12 at a panel connecting structure 16 along one edge of the enclosure. Rear panel 12 defines a tablet-receiving volume sized to receive a display tablet T (FIG. 2). Front panel 14 can be opened and closed on rear panel 12 to insert and secure display tablet T in the enclosure.

The illustrated enclosure 10 is sized and shaped for an Apple® Ipad® display tablet. It will be understood that the dimensions and shape of enclosure 10 may vary according to the type of display tablet intended to be secured therein, and need not take the same shape as the tablet. In general, however, display tablets are rectangular, and enclosure 10 will generally be shaped accordingly. Panel-connecting structure 16 is located along a substantially straight edge of the enclosure.

A lock 18 (of any known type) can be provided to secure the front panel 14 in the closed position on the rear panel 12, such that only authorized persons may open the enclosure 10 to remove the display tablet T. In the illustrated embodiment, lock 18 is a tubular push lock of known, commercially available type incorporated on a side of the enclosure opposite the panel-connecting structure.

Panels 12 and 14 are made, for example, from aluminum, although other metals and/or polymer materials sufficiently strong to make the enclosure theft-resistant (when locked) could be used in various combinations, without limitation.

Front panel 14 is detachably and pivotally secured to rear panel 12 by panel-connecting structure 16, whose assembly and function are best illustrated in FIGS. 3 and 3A. Panel-connecting structure 16 includes mating features residing on both panels 12 and 14, and more particularly along mating sides of the panels that form a straight side of enclosure 10 when the panels are mated.

Referring to FIGS. 3 and 3A (and 4 and 4A), the panel-connecting structure on rear panel 12 comprises substantially vertical wall 20 extending upwardly from the mating edge of the rear panel on a radiused joint or bend 22. The wall 20 is interrupted by one or more radiused tab-receiving slots 24 through the radiused joint. It would be possible for wall 20 to be discontinuous, although less secure in terms of tamper-resistance. A single wall 20 with a single long slot 24 is also possible.

Referring to FIGS. 3 and 3A (and 5 and 5A), the panel-connecting structure on front panel 14 comprises a generally U-shaped channel 26 formed along an interior edge of the front panel (facing or communicating with the interior of the enclosure when the front panel is assembled on the rear panel). The U-shaped channel 26 comprises a substantially vertical flange 28 extending downwardly from the inside surface of the front panel 14, and one or more substantially horizontal tabs 30 extending inwardly from a distal end of the vertical flange 28 on radiused bends 32. Although multiple tabs projecting from a continuous wall are shown, multiple tabs from a discontinuous wall would be possible, as would a single tab from a continuous or discontinuous wall, provided the number and sizing and location of the tab(s) matches the slot(s) in rear panel 12. "U-shaped" as used herein should be understood to include similar shapes such as C- and J-shapes, where the vertical flange portion 28 and the horizontal tab portion 30 may be portions of a more or less continuous curve, as well as somewhat squared shapes where the bends in the panel material are of a smaller radius and form junctions between portions of the channel that are relatively straight.

Figure 4B:
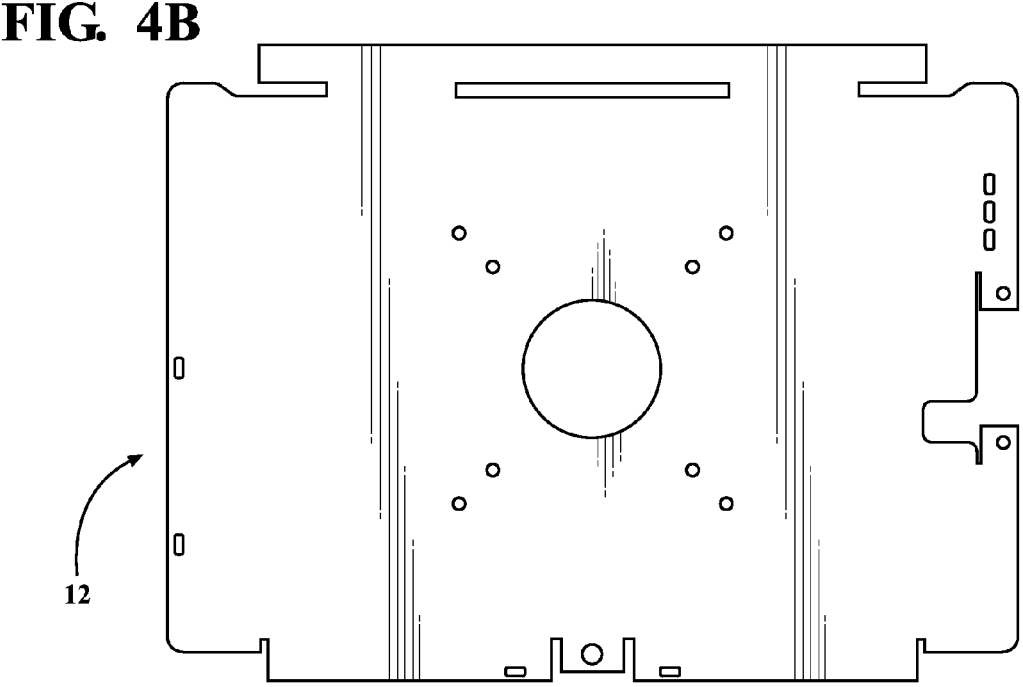
FIG. 4B is a plan view of a flat blank from which a panel with features such as shown in FIG. 4 can be formed.
Figure 5B:
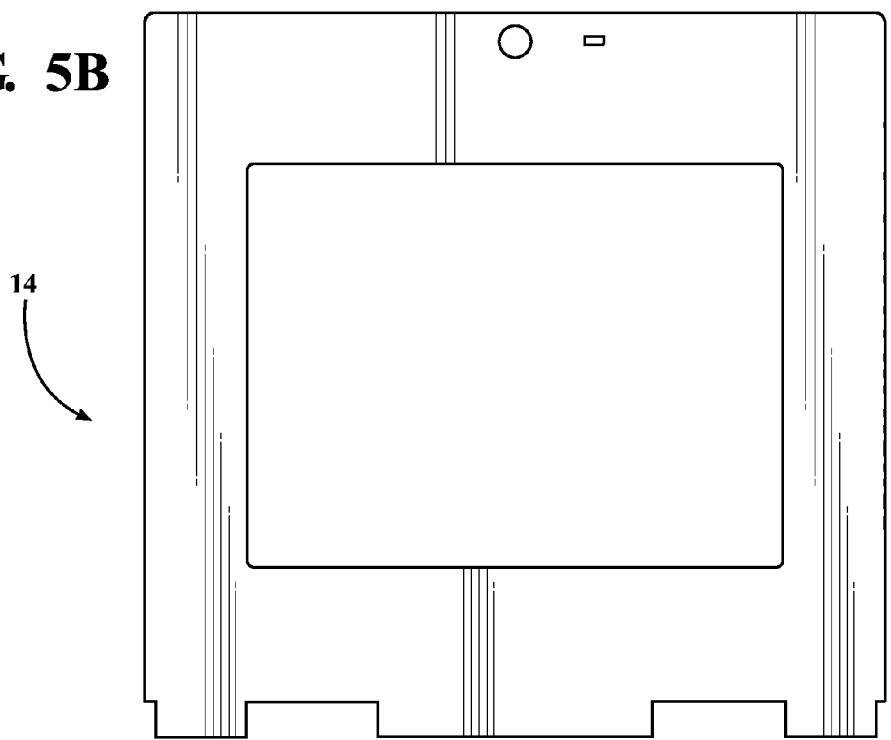
FIG. 5B is a plan view of a flat blank from which a panel with features such shown in FIG. 5 can be formed.
Figure 6:
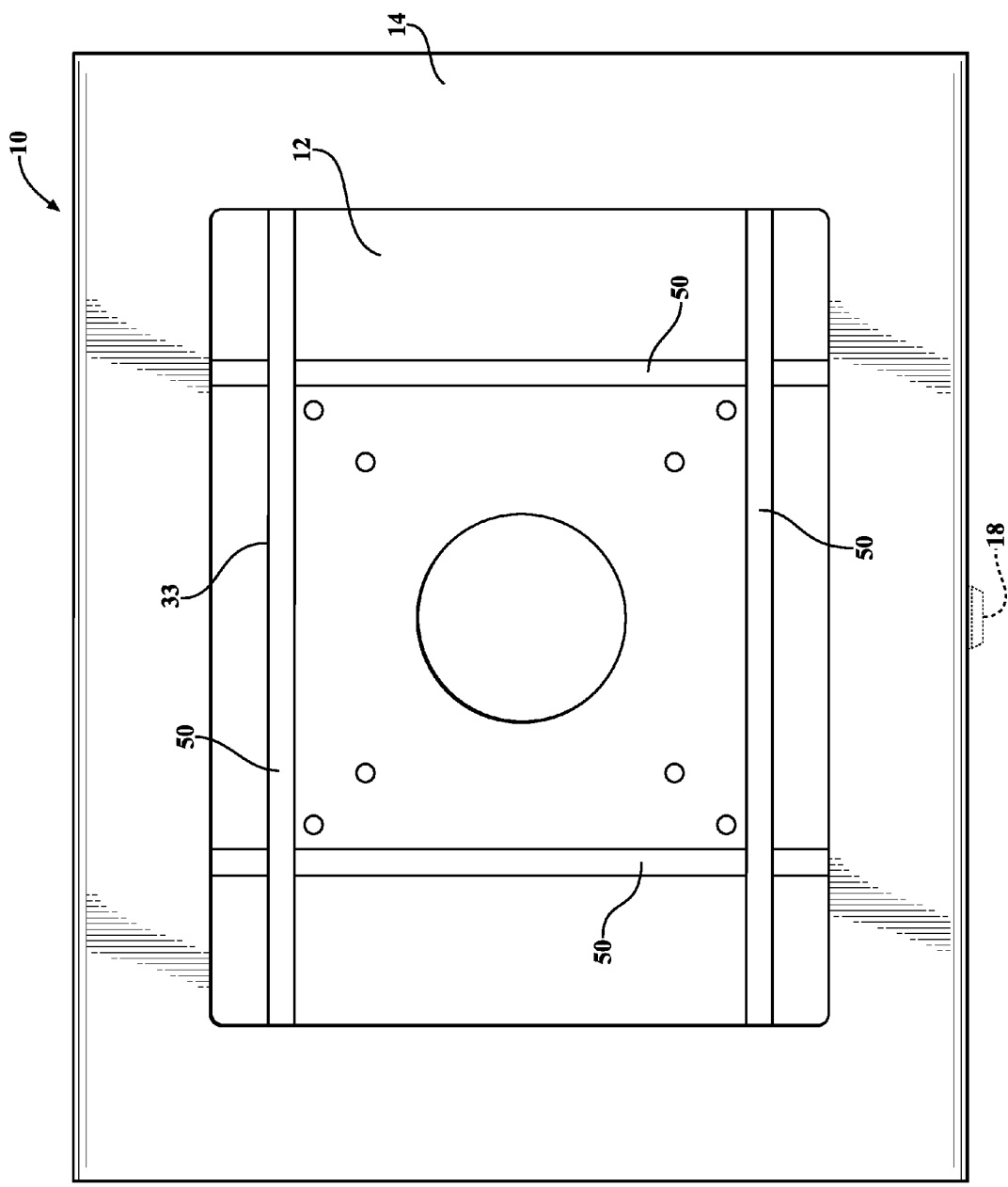
FIG. 6 is a front plan view of the enclosure of FIG. 1.
Figure 7:
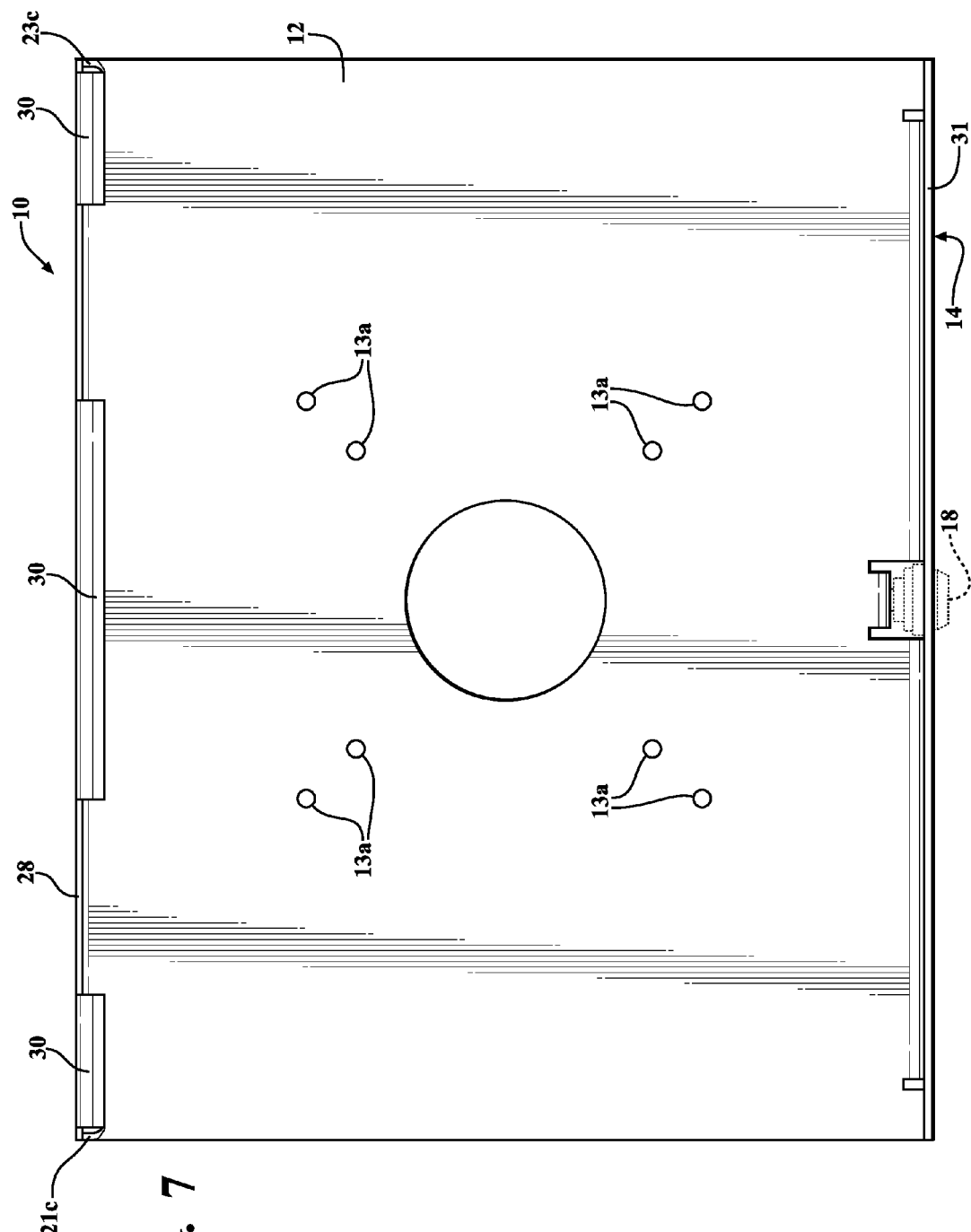
FIG. 7 is a rear plan view of the enclosure of FIG. 1.

Bends 22 and joints 32 are "radiused" or rounded on the surfaces that co-act with other panel-connecting surfaces; i.e., surfaces 22a and 22b of bends 22 and surfaces 32a and 32b of joints 32 are radiused. The radiused bends 22 and joints 32 between the panel-connecting wall 20 and tabs 30 and their respective panels may be formed in different ways, but in the illustrated example they are formed by shaping and bending edge portions of the aluminum panels using known metal-forming machines and processes. Depending on the material used for panels 12 and 14, other known processes for shaping the tabs and walls from the panel material could be used, for example molding or casting techniques. The illustrated panel-connecting structure 16 is accordingly formed integrally from the material of panels 12 and 14. Exemplary flat blanks from which panels 12 and 14 are formed are illustrated in FIGS. 4B and 5B.

As best shown in FIG. 4A, panel-connecting slots 24 between bends 22 are also radiused, in the sense that they encompass or define an approximately quarter-cylindrical volume through an arc of approximately 90 degrees. The arc of slots 24 may vary, provided they permit front panel 14 to rotate sufficiently open and closed that a display tablet can be inserted into the enclosure, secured in place, and removed from the enclosure. Slots 24 may be formed in the panel material using known processes, including but not limited to stamping and laser cutting processes. Slots 24 may be formed before or after wall 20 is set in its vertical orientation relative to rear face 13 of rear panel 12.

In the illustrated example, there are three spaced panel-connecting slots 24 on rear panel 12, and three spaced panel-connecting tabs 30 on front panel 14. This number may vary, and a single tab/slot arrangement is possible although less strong. Tabs 30 are sized and spaced to be inserted into slots 24 in the direction of assembly A illustrated by the projection line in FIG. 3. Front panel 14 can be assembled to rear panel 12 at angles between about 10 degrees and 80 degrees from horizontal (rear panel 12), but assembly is optimal at about 45 degrees.

Once tabs 30 are inserted fully through slots 24 as shown in FIG. 3A, front panel 14 is connected to rear panel 12 to open and close without separating inadvertently from the rear panel. Front panel 14 is capable of movement on rear panel 12 between a fully closed position C and a fully open position O as shown in FIG. 3A. The abutting interference between panel-connecting tabs 30 and wall 20 in the open position prevents front panel 14 from being opened more than 90 degrees (perpendicular) relative to rear panel 12, and as illustrated tends to limit the open position of front panel 14 to less than 90 degrees unless the panel and/or the tabs are flexed.

Referring now to FIGS. 4 and 4A, the remainder of rear panel 12 is described. Rear panel 12 includes a rear face 13 and additional sidewalls 21, 23, and 25. Rear face 13 may be provided with surface-mounting structure such as holes 13a for screws or other fasteners. Top and bottom sidewalls 21 and 23 may include apertures 21*a* and 23*a* that admit audio, power, or information-transferring plugs or cords, provide outlets for sound from tablet speakers, or provide a view of tablet indicator lights. Sidewalls 21 and 23 may also include larger openings such as 21*b* for card reader devices, larger I/O connectors, and other accessories, without limitation. Front sidewall 25 includes a mounting location 25*a* for a lock mechanism such as the tubular push-lock 18 mentioned above. Sidewalls 21, 23, and 25 are formed integrally from the material of panel 12 in the same manner as panel-connecting wall 20, by bending a pre-cut portion of the rear panel upwardly to a position perpendicular to rear face 13.

The sidewalls 20, 21, 23, and 25 on rear panel 12 at least partially define a tablet-receiving volume 27 sized to receive display tablet T, the volume adapted to be closed and/or completed by front panel 14. Tablet receiving volume 27 is equal to or greater than the volume of display tablet T for which the enclosure is designed.

The inner ends of sidewalls 21 and 23 are beveled in their lower (rear) corners 21*c* and 23*c* to provide clearance for panel-connecting tabs 30 when the front panel 14 rotates, aligned with and functioning as extensions of adjacent slots 24. In the illustrated example, the ends of all of the sidewalls 20, 21, 23, and 25 are spaced from their adjacent sidewalls, for example by making appropriate cuts in the flat panel material before the sidewalls are bent upwardly into their final shape during manufacturing. The spaces between the sidewall ends are closed by the inner and outer flanges of the front panel 14 when the front panel is closed over the rear panel (see FIGS. 1 and 2).

Rear panel 12 may also include a novel T-shaped power cord outlet 60 designed to admit a wide, flat power plug with a relief (the stem of the "T") for an attached cord. The wire exit or stem of the T allows the cable to exit the enclosure out the back or down the bottom if mounted directly onto a wall.

Referring to FIGS. 5 and 5A, the remainder of front panel 14 is described. Front panel 14 includes the panel-connecting structure 26, 28 and 30 described above, a cover flange 31 on the opposite edge, a screen opening 33, and a tablet-securing frame or front face 34. Cover flange 31 is adapted to fit over sidewall 25 on rear panel 12 when front panel 14 is closed on rear panel 12, with a snug face-to-face fit that resists prying tools. Screen opening 33 is sized and shaped to provide viewing and operational access to the screen of tablet T, but to be smaller than the overall dimensions of the tablet so that frame portion 34 of the front face prevents removal of the tablet from the enclosure.

Tablet-securing front face 34 is shown as a regular, symmetrical frame around opening 33. Front face 34 can alternately be provided with cutouts, irregular edges, or apertures to access or view various features on an enclosed display tablet that lie beyond the edges of the tablet's touchscreen.

A lock-receiving aperture or other lock structure 35 cooperates with the locking mechanism 18 on sidewall 25, or carries part of a locking mechanism shared between flange 31 and sidewall 25, or carries a lock that cooperates with a receiver on sidewall 25. Locking means separate from enclosure 10 could also be used, for example a padlock or cable lock, and lock structures 35 and 25*a* may simply be cooperating hasps or apertures designed to receive such separate locking means. The locking means for enclosure 10 may also be located elsewhere on the enclosure, and is not limited to the edge or side opposite the panel-connecting structure 16.

FIG. 5A shows the shape of U-shaped panel-connecting channel 26 in detail. The upper radius 26*b* is radiused more gradually than the inner or lower corner 32*b* for aesthetics, adapted to mate in a close fit against the rounded upper corners of rear panel sidewalls 21 and 23. The smaller radius of inner and outer corners 32*b* and 32*a* on tabs 30 provides a close fit with slots 24 in the rear panel, and gives the front panel a two-part motion that is partly pivotal and partly arcuate and that helps reduce interference with any work surface to which the enclosure is secured when the front panel is opened and closed.

The illustrated panel-connecting structure 16 lends itself to being manufactured by bending originally flat portions of the front and rear panels into the final panel-connecting walls and tabs, which reduces manufacturing complexity and cost. Additionally, the resulting structure is strong, theft-resistant, easy to assemble and disassemble, aesthetically pleasing, and provides a unique closure action for use on enclosures secured to flat surfaces.

FIGS. 2, 4, and 12 illustrate two alternate structures for locating a display tablet T within tablet-receiving volume 27 before front panel 14 is closed.

The first structure (FIGS. 2 and 12) is a set of interlocking spacers 50 made from a resilient rubber or foam material, configured to interlock in a grid pattern to locate the edges of tablet T in parallel to the sides of the enclosure and to center the tablet touchscreen. Spacers 50 include hook ends 52 to resiliently capture the sides of tablet T, and interlock notches 54 adapted to hold the spacers securely in a grid pattern inside the enclosure. While enclosure 10 may be manufactured in different shapes and sizes to accommodate different brands or models of display tablet, providing different sets of spacers 50 configured for different display tablets can allow a single enclosure to accommodate a range of tablet shapes and sizes.

The second structure (FIG. 4) is a set of tabs 40 bent into the tablet-receiving volume from the material of rear panel face 13, configured to locate the edges of tablet T in parallel to the sides of the enclosure, and to center the tablet's touchscreen relative to opening 33.

Description of Operation

In operation, rear panel 12 of enclosure 10 is secured to a work surface S as shown in FIG. 2, with various fasteners F that may include mechanical, adhesive, hook-and-loop, or magnetic fastening means, depending on the level of security desired. It is possible to secure rear panel 12 to surface S before front panel 14 is attached to the rear panel, unless some raised portion of the work surface adjacent the panel-connecting edge 16 blocks the front panel assembly angle shown in FIG. 3. If work surface S is flat, however, front panel 14 can be connected to and detached from panel 12 after panel 12 has been fastened to the work surface.

With front panel 14 either open or removed, any spacers 50 are placed in rear panel 12 in the desired tablet-locating pattern. Display tablet T is inserted in the tablet-receiving volume 27 of rear panel 12 on top of the spacers, or in locating contact with any tabs 40 or other locating structure. Front panel 14 is assembled to and/or closed over rear panel 12 until the locking mechanism 18 is engaged. Display tablet T can then be accessed by the public through screen opening 33, and connected to various accessories through apertures formed in the sides and top panel, without being removed from the enclosure.

Panel-connecting structure 16 is self-covering, largely contained in the interior of the enclosure, and presents only a few smooth, close-fitting surfaces to the exterior of the enclosure when the front panel is closed and locked on the rear panel. This makes panel-connection 16 tamper-resistant when the front panel is locked down.

It will be understood that the disclosed embodiments represent presently preferred examples of how to make and use the invention, but are intended to enable rather than limit the invention. Variations and modifications of the illustrated examples in the foregoing written specification and drawings may be possible without departing from the scope of the invention. It should further be understood that to the extent the term "invention" is used in the written specification, it is not to be construed as a limiting term as to number of claimed or disclosed inventions or discoveries or the scope of any such invention or discovery, but as a term which has long been conveniently and widely used to describe new and useful improvements in science and the useful arts. The scope of the invention supported by the above disclosure should accordingly be construed within what it teaches and suggests to those skilled in the art, and within the scope of any claims that the above disclosure supports in this application or in any other application claiming priority to this application.

What is claimed:

1. An enclosure for mounting and securing a display tablet on a surface, comprising:
   a rear panel comprising a rear face and sidewalls at least partially defining an enclosure volume and adapted to be mounted on a surface, and a front panel detachably and pivotally secured to the rear panel with an interior panel-connecting structure along an edge of the enclosure, the front panel pivotal on the rear panel from an open tablet-receiving position to a closed tablet-securing position closing the enclosure volume, the front panel including a front face with a touchscreen access opening and an access-limiting frame portion around the touchscreen access opening;
   the hidden panel-connecting structure comprising a generally U-shaped channel formed along an interior edge of the front panel, the U-shaped channel comprising a substantially vertical flange extending downwardly from the edge of the front panel and at least one substantially horizontal tab extending inwardly on a radiused tab bend from a distal end of the vertical flange, the hidden panel-connecting structure further comprising a substantially vertical wall extending upwardly from a mating interior edge of the rear panel on a radiused wall bend, the wall bend interrupted by at least one radiused tab-receiving slot through the wall bend corresponding to the at least one tab on the front panel.

2. The enclosure of claim 1, wherein the at least one radiused tab-receiving slot encompasses an arc of approximately 90 degrees.

3. The enclosure of claim 1, wherein the enclosure comprises a plurality of raised internal locating tabs bent upwardly from a face of the rear panel into the enclosure volume of the rear panel, the locating tabs placed to locate a display tablet relative to the touchscreen access opening in the front panel.

4. The enclosure of claim 1, wherein the rear face of the rear panel comprises a T-shaped cord-relief cutout adapted to receive a horizontal plug and a portion of cord.

5. The enclosure of claim 1, wherein a sidewall on the rear panel includes a card reader opening.

6. The enclosure of claim 1, wherein the at least one tab comprises a plurality of tabs extending inwardly on radiused tab bends from a distal end of the vertical flange, and wherein the at least one radiused tab-receiving slot comprises a plurality of slots corresponding to the plurality of tabs on the front panel.

7. A secure electronic display comprising:
   a display tablet;
   an enclosure mounting and securing the display tablet on a surface, the enclosure comprising a rear panel comprising a rear face and sidewalls at least partially defining an enclosure volume and mounted on the surface, and a front panel detachably and pivotally secured to the rear panel with an interior panel-connecting structure along an edge of the enclosure, the front panel pivotal on the rear panel from an open tablet-receiving position to a closed tablet-securing position closing the enclosure volume, the front panel including a front face with a touchscreen access opening and an access-limiting frame portion around the touchscreen access opening;
   the hidden panel-connecting structure comprising a generally U-shaped channel formed along an edge of the front panel, the U-shaped channel comprising a substantially vertical flange extending downwardly from an interior edge of the front panel and at least one substantially horizontal tab extending inwardly on a radiused tab bend from a distal end of the vertical flange, the hidden panel-connecting structure further comprising a substantially vertical wall extending upwardly from an interior mating edge of the rear panel on a radiused wall bend, the wall bend interrupted by at least one radiused tab-receiving slot through the wall bend corresponding to the at least one tab on the front panel.

* * * * *